US008827199B2

(12) United States Patent
Aeberli et al.

(10) Patent No.: US 8,827,199 B2
(45) Date of Patent: Sep. 9, 2014

(54) TURBOSHAFT ENGINE SUPPORTING PYLON COVERED WITH A POROUS MATERIAL AND TURBOSHAFT ENGINE/PYLON ASSEMBLY

(75) Inventors: Sebastien Jean-Paul Aeberli, Paris (FR); Alexandre Alfred Gaston Vuillemin, Fontainebleau (FR)

(73) Assignee: SNECMA, Paris (FR)

( * ) Notice: Subject to any disclaimer, the term of this patent is extended or adjusted under 35 U.S.C. 154(b) by 110 days.

(21) Appl. No.: 13/636,864

(22) PCT Filed: Mar. 21, 2011

(86) PCT No.: PCT/FR2011/050572
§ 371 (c)(1),
(2), (4) Date: Sep. 24, 2012

(87) PCT Pub. No.: WO2011/117521
PCT Pub. Date: Sep. 29, 2011

(65) Prior Publication Data
US 2013/0009002 A1    Jan. 10, 2013

(30) Foreign Application Priority Data
Mar. 23, 2010 (FR) ..................................... 10 52107

(51) Int. Cl.
*B64C 1/40*    (2006.01)
*B64C 23/00*    (2006.01)
*B64D 27/00*    (2006.01)
*F02K 1/34*    (2006.01)
*B64D 29/02*    (2006.01)

(52) U.S. Cl.
CPC ................ *B64D 33/06* (2013.01); *B64D 29/02* (2013.01)
USPC ........................................... 244/1 N; 244/54

(58) Field of Classification Search
USPC ........ 244/1 N, 54; 60/796, 797; 248/554, 557
See application file for complete search history.

(56) References Cited

U.S. PATENT DOCUMENTS 5,156,353 A * 10/1992 Gliebe et al. .................... 244/54
8,550,397 B2 * 10/2013 Verde Preckler et al. ..... 244/1 N
(Continued)

FOREIGN PATENT DOCUMENTS

| EP | 1 849 987 | 10/2007 |
| FR | 2 913 401 | 9/2008 |
| WO | 2010 012900 | 2/2010 |

OTHER PUBLICATIONS

International Search Report Issued Aug. 1, 2011 in PCT/FR11/050572 Filed Mar. 21, 2011.

*Primary Examiner* — Philip J Bonzell
(74) *Attorney, Agent, or Firm* — Oblon, Spivak, McClelland, Maier & Neustadt, L.L.P.

(57) ABSTRACT

A turboshaft engine supporting pylon covered with a porous material and a turboshaft engine/pylon assembly. The pylon supports a turboshaft engine on an aircraft, and includes an outer surface covered at least partially with a porous material to reduce amplitude of acoustic waves leaving the turboshaft engine. The assembly includes a turboshaft engine and a pylon, in which the pylon extends longitudinally from upstream to downstream and includes an upper part for securing to the aircraft, a lower part for securing to the turboshaft engine, and an absorption part extending in an exhaust stream from the turboshaft engine and including an internal absorption part extending inside the turboshaft engine and an external absorption part extending downstream of the turboshaft engine. The outer surface of the upstream end of the external absorption part of the pylon is covered with a porous material to limit noise formation downstream of the engine.

11 Claims, 3 Drawing Sheets

(56) References Cited

U.S. PATENT DOCUMENTS

| | | |
|---|---|---|
| 2002/0189896 A1 | 12/2002 | Tse |
| 2007/0251212 A1 | 11/2007 | Tester |
| 2008/0217468 A1 | 9/2008 | Fol |
| 2009/0152400 A1* | 6/2009 | Verde Preckler et al. ...... 244/133 |
| 2010/0024435 A1 | 2/2010 | Vauchel |
| 2011/0133025 A1 | 6/2011 | Vauchel et al. |
| 2012/0061510 A1* | 3/2012 | Thomas et al. ................. 244/54 |
| 2012/0068011 A1* | 3/2012 | Thomas et al. ............... 244/1 N |

* cited by examiner

TURBOSHAFT ENGINE SUPPORTING PYLON COVERED WITH A POROUS MATERIAL AND TURBOSHAFT ENGINE/PYLON ASSEMBLY

BACKGROUND OF THE INVENTION

1. Field of the Invention

The field of the present invention relates to civil aviation and, in particular, to noise generation by planes.

2. Description of the Related Art

The noise generated by civil planes, notably at take-off, is a widely known disturbance and numerous innovations have been imagined to try to reduce it. One of the main sources of this noise lies in the jet of the engines, which are used at full power during the phase of take-off. Of course, important works have been carried out to try to reduce the noise of the reactor jet, as for example saw-toothed chevrons for the exhaust nozzles: the hot gases one, from the main stream of the reactor, and the nozzle for said cold gases which come from the by-pass air of the engine.

To limit the disturbances undergone by the side residents of airports, strict standards have been imposed, which limit the noise which can be heard in different points situated around the plane, at various distances and in several directions with regard to the take-off runway.

One of the particularly critical points to be taken into account by plane designers, in terms of acceptable maximal noise to obtain the certification of a plane, is in a lateral position with regard to the plane, at a distance of 450 m from the take-off runway. The presence of the pylon, i.e. the mast which supports the engine and fastens it to the wing, locally generates, at the place of the gas exhaust, high levels of turbulence in the flow, with consequently a very significant increase of the side noise from the engine. This phenomenon is particularly acute for the configurations where the pylon is prominent beyond the plane of exhaust of gases, which becomes a very frequent configuration in the recent civil planes.

The results of numerical calculations or measures made with models in a wind tunnel clearly show that the effects of interactions between the stream circulating around the pylon and the pylon itself generate a considerable increase of the levels of turbulence and, as a consequence, of the noise level. An important modification of the angular development of the jet radially around the pylon can be also noted, which tends to direct the reactor jet around the pylon, in the direction of the wing.

Besides, the acquired experience shows that the introduction of the pylon, in addition to its influence on the sound level increase in a configuration of conventional exhaust, can also considerably reduce the efficiency of others devices provided for reducing the noise of exhaust gases, such as chevrons or mixers provided on the nozzles.

So, the presence of the pylon introduces, in terms of acoustics, an increase of the exhaust noise at the side point of certification, which can vary between 2 and 3.5 EPNdB (Effective Perceived Noise, or level of the effectively heard noise, in decibels) according to the engine cycle, the size of the pylon and the considered geometries of exhaust. In reference to FIG. 1 showing a noise curve $B_M$ of a turboshaft engine without pylon and a noise curve $B_{MP}$ of a turboshaft engine with pylon, the presence of the pylon generates turbulent kinetic energy in excess downstream therefrom. The turbulences form small whirling structures which grow and irradiate outside the turboshaft engine at low frequency and generate noise.

The need to reduce the jet noise being a constant concern of engine manufacturers, the interest to reduce the noise at source is obvious, that is by acting on the local turbulent flows around the pylon. In fact, the potential of noise reduction even seems more important than the one induced by the implementation of chevrons or micro jets to the nozzle periphery.

BRIEF SUMMARY OF THE INVENTION

The present invention aims at resolving these previous art drawbacks by providing a reduction device for the noise generated by an engine mounted to the pylon of an aircraft, in particular the noise associated with the interaction between the engine jet and the airflow around the pylon.

Besides, with patent application FR 2 913 401 from AIRBUS corporation, an aircraft comprising a mast wherein a recess is provided, closed by a porous wall arranged to attenuate a shock wave generated by the aircraft when the latter approaches or exceeds the speed of sound, is known. Such a porous wall is not appropriate to reduce the intensity of the acoustic waves at the outlet of the turboshaft engine resulting from the interaction between the engine jet and the airflow around the pylon.

To eliminate at least some of these drawbacks, the invention concerns a pylon supporting a turboshaft engine on an aircraft, the pylon longitudinally extending from upstream to downstream and comprising an upper part for securing to the aircraft and a lower part for securing to the turboshaft engine, said securing part to the aircraft being downstream from the securing part to the turboshaft engine, the pylon comprises an absorption part intended to extend in the exhaust stream of the turboshaft engine, located downstream from the securing part to the turboshaft engine and located bottomly with respect to the securing part to the aircraft, the outer surface of which is covered at least partially with a porous material arranged to reduce the intensity of the acoustic waves at the outlet of the turboshaft engine.

The absorption part of the pylon which is the most capable to generate noise is covered with a porous material. So, the generated noise can be locally limited by modifying only a part of the coating of the pylon.

Advantageously, the porous material allows to improve the interaction between the exhaust stream of the turboshaft engine and the pylon so as to limit noise generation. The porous material allows advantageously to improve the shear layer of the exhaust stream which contacts the pylon while attenuating the amplitude of the acoustic waves emitted by the turboshaft engine.

According to a variant, the porous material of the pylon is a metal foam, preferably formed by conglomeration of metal particles. Advantageously, a metal foam allows to form an acoustic filter having a wide range of frequency attenuations. The amplitude of the acoustic waves is thus attenuated in an important range of frequencies, which limits the noise generated by the pylon.

Preferably, the outer surface of the downstream end of the absorption part is covered with a porous material. Since turbulences grow as they go away downstream from the turboshaft engine, it is important to limit the impact of important turbulences which contact the most downstream pylon end, that is the most remote from the turboshaft engine.

Still preferably, all the outer surface of the absorption part is covered with a porous material. The shear layer is thus improved on all the absorption part intended to extend in the exhaust stream.

Preferably, the porous material is arranged to attenuate by at least 6 dB the acoustic waves emitted in a range of high frequencies between 200 Hz and 1 kHz so as to limit the generation of kinetic energy at the outlet of the turboshaft engine. Because of its structure, the porous material allows to attenuate the acoustic waves in a wide frequency range.

Still preferably, the porous material is arranged to attenuate by at least 10 dB the acoustic waves emitted in a range of high frequencies between 400 Hz and 600 Hz. Advantageously, the thickness of the porous material is setup to obtain the wished attenuation. As an example, a foam thickness of approximately 5 to 15 cm allows to obtain a satisfactory attenuation of the acoustic waves from the turboshaft engine.

The invention also concerns an assembly of a turboshaft engine and a pylon such as previously set forth, the pylon longitudinally extending from upstream to downstream and comprising an upper part for securing to the aircraft, a lower part for securing to the turboshaft engine and an absorption part, extending in the exhaust stream of the turboshaft engine, comprising an internal absorption part, extending inside the turboshaft engine, and an external absorption part, extending downstream from the turboshaft engine, in which pylon the outer surface of the downstream end of the external absorption part is covered at least partially with a porous material.

Preferably, the whole outer surface of the external absorption part is covered with a porous material.

Still preferably, the whole outer surface of the internal absorption part is covered with a porous material.

The invention also concerns an assembly of an aircraft wing and a pylon such as previously set forth, wherein the pylon is mounted to a lower surface of the aircraft wing, said lower surface of the wing being covered at least partially with a porous material arranged to reduce the amplitude of the acoustic waves at the outlet of the turboshaft engine.

BRIEF DESCRIPTION OF THE SEVERAL VIEWS OF THE DRAWINGS

Other characteristics and advantages of the invention will appear in the description which follows and refers to accompanying drawings given as non-limiting examples.

DETAILED DESCRIPTION OF THE INVENTION

Figure 3A:
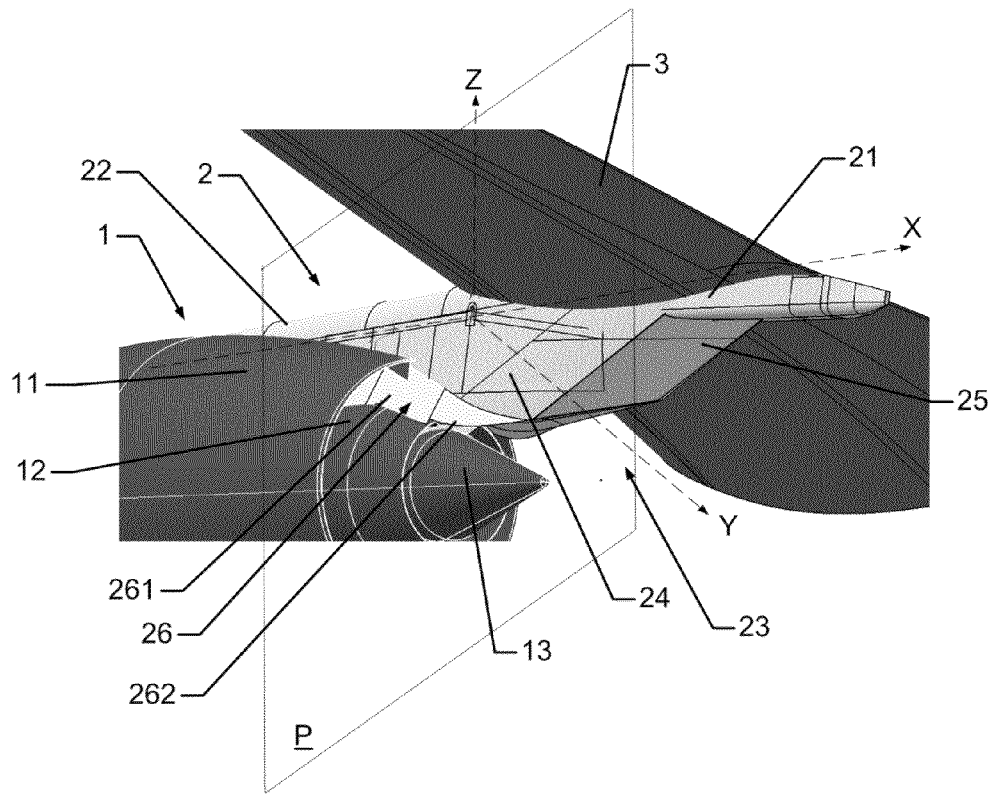
FIG. 3A is a representation of a first embodiment of a pylon according to the invention supporting a turboshaft engine on an aircraft wing, the downstream end of the external absorption part of the pylon being covered with a porous material.

Referring to FIG. 3A, a by-pass turboshaft engine 1 is represented wherein a main stream, or hot stream, and a by-pass air, or cold stream, exhaust from the outlet of the turboshaft engine. In particular, the turboshaft engine 1 comprises an outer fairing 11 for the by-pass air channel, an outer fairing 12 for the main stream channel, and an exhaust cone 13. The latter defines, along with the outer fairing 12 for the main stream channel, the main stream nozzle. The by-pass air channel is provided between the outer fairing 11 and the outer fairing 12 for the main stream channel, and opens onto the secondary nozzle. Thereafter, with referring to FIG. 3A, an exhaust plane P of by-pass air extending perpendicularly to the X-axis of the turboshaft engine 1 is defined at the mouthpiece of the by-pass air channel of the turboshaft engine 1.

Referring to FIG. 3A, an orthonormal frame of reference (X, Y, Z) is defined, wherein the X-axis corresponds to the turboshaft engine axis oriented from upstream to downstream, the Y-axis corresponds to the side axis inwardly oriented from the outside of the aircraft and the Z-axis corresponds to the vertical axis oriented from bottom to top. Thereafter, the terms "upper" and "lower" are defined with regard to the vertical axis Z of FIG. 3A.

The turboshaft engine 1 is made integral with a wing 3 of an aircraft by means of a pylon 2 for supporting the turboshaft engine 1 which is here one-piece. Referring to FIG. 3A, the pylon longitudinally extends from upstream to downstream according to the X-axis of the turboshaft engine and comprises an upper part 21 for securing to the wing 3 of the aircraft and a lower part 22 for securing to the turboshaft engine 1, said part 21 for securing to the aircraft being downstream from part 22 for securing to the turboshaft engine.

As shown in FIG. 3A, the turboshaft engine 1 is mounted upstream from the aircraft wing 3, the lower surface of the upstream part of pylon 2 comprises means for securing to the turboshaft engine, of clamp and link type, which are known by persons skilled in the art. Also, the upper surface of the downstream part of the pylon 2 comprises means for securing to the wing 3, of clamp and link type, which are known by persons skilled in the art.

The pylon 2 comprises an absorption part 23 through which the efforts of the turboshaft engine 1 pass to the wing when the turboshaft is longitudinally moved according to the X-axis with regard to the aircraft wing. Referring to FIG. 3A, the turboshaft engine 1 is moved here axially towards the upstream with regard to the wing 3. The absorption part 23 extends in the exhaust stream of the turboshaft engine 1 and is located downstream from part 22 for securing to the turboshaft engine and bottomly with respect to part 21 for securing to the aircraft.

The absorption part 23 comprises an internal part 26, extending inside the turboshaft engine 1, that is upstream to the exhaust plane P of the turboshaft engine 1, and an external part 24, extending downstream from the exhaust plane P of the turboshaft engine 1. The internal absorption part 26 comprises in this example a secondary securing zone 261 extending between the outer fairing 11 of the by-pass air channel and the outer fairing 12 of the main stream channel in the by-pass channel and a main securing zone 262 extending between the outer fairing 12 of the main stream channel 12 and the exhaust cone 13 in the main stream, the securing zones 261, 262 of the pylon 2 allowing to firmly and reliably support the various elements of the turboshaft engine 1 during its use.

The external absorption part 24 is streamlined in the X direction of the engine so as to limit its impact on both primary and secondary exhaust streams.

Figure 1:
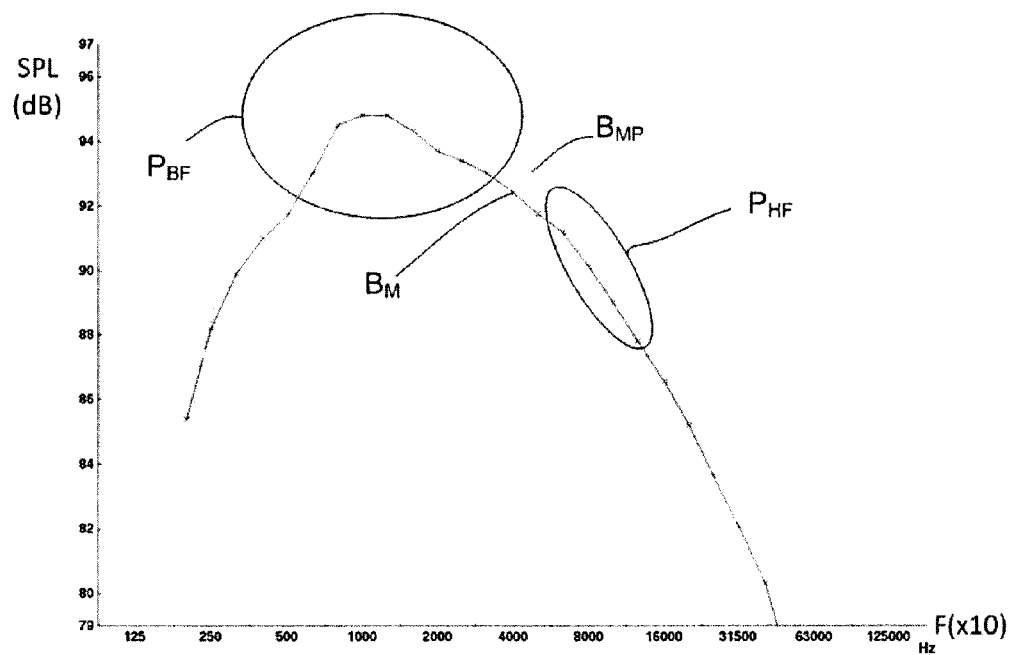
FIG. 1 is a representation of the noise level in decibels depending on the frequency of the acoustic waves coming from a turboshaft engine with and without pylon (already described)

As previously detailed, the presence of a pylon 2 has a negative impact on the noise generation as shown in FIG. 1. To resolve this drawback, the outer surface of pylon 2 is covered with a porous material represented by shaded lines in FIGS. 3A-3C.

In this example, the porous material appears in the form of a metal foam, having a thickness of about 5 to 15 cm, comprising approximately 5% of metal and 95% of air in volume, the foam being preferably formed by conglomeration of metal particles such as titanium. Other metal materials could also be appropriate to form the porous material.

The porous material includes cavities with reduced dimensions arranged to attenuate sound waves coming from the turboshaft engine. Preferably, the material has a foamed structure, also known as "honeycomb", to attenuate the formation of noise. Such a structure has a variable impedance which allows to shift the phase of waves emitted in phase when they contact zones different from the porous material, which limits the formation of noise.

In reference to the noise curve $B_{MP}$ of FIG. 1 representing the noise generated by a turboshaft engine with a pylon, it should be noted that the influence of the pylon 2 is significant in a range of low frequencies $P_{BF}$ between 25 Hz and 200 Hz, and in a range of high frequencies $P_{HF}$ between 200 Hz and 1 kHz.

Figure 2:
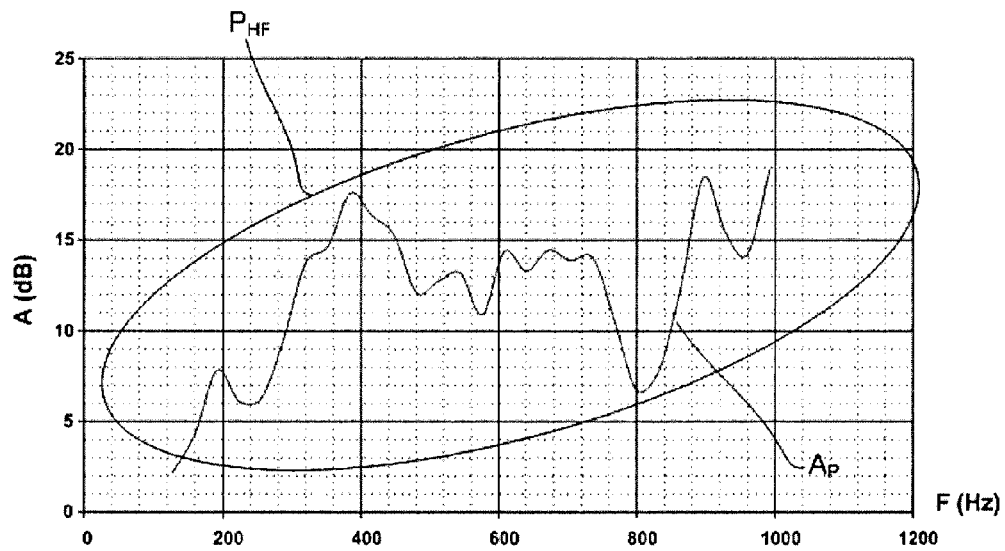
FIG. 2 is a representation of the attenuation level in decibels brought by the porous material covering a pylon according to the invention depending on the frequency of the acoustic waves.

The noise generated in the range of high frequencies $P_{HF}$ mainly results from the reflection of the low frequency acoustic waves on the outer surface of the pylon 2. To limit the reflection of the low frequency acoustic waves and attenuate the intensity of the reflected waves, the outer surface of the pylon is covered at least partially with a porous material the attenuation curve of which $A_P$ is represented in FIG. 2.

The attenuation of the porous material allows to limit the amplitude of the reflected acoustic waves, a foamed material further allowing to limit the reflection phenomenon. In other words, in comparison with a typical acoustic attenuator, a porous acoustic material allows to fulfill a double function as it limits the reflection rate of acoustic waves and decreases the intensity of the reflected waves.

According to a first embodiment of the invention, in reference to FIG. 3A, the porous material covers the downstream end 25 of the external absorption part 24 of the pylon 2. In reference to FIG. 2, because of the attenuation $A_P$ by the porous material in the high frequency range $P_{HF}$, the reflection of the low frequency acoustic waves coming from the turboshaft engine on the pylon 2 is decreased because of its porous coating. The amplitude of the reflected waves generated at the downstream end 25 of the external absorption part 24 of the pylon 2 is decreased.

It is particularly advantageous given that the turbulences coming from the turboshaft engine grow as they travel downstream. When protecting the downstream end 25 of the absorption part of the pylon 2 with a porous material, an important source of noise is suppressed by locally modifying the surface roughness of the pylon 2.

Figure 3B:
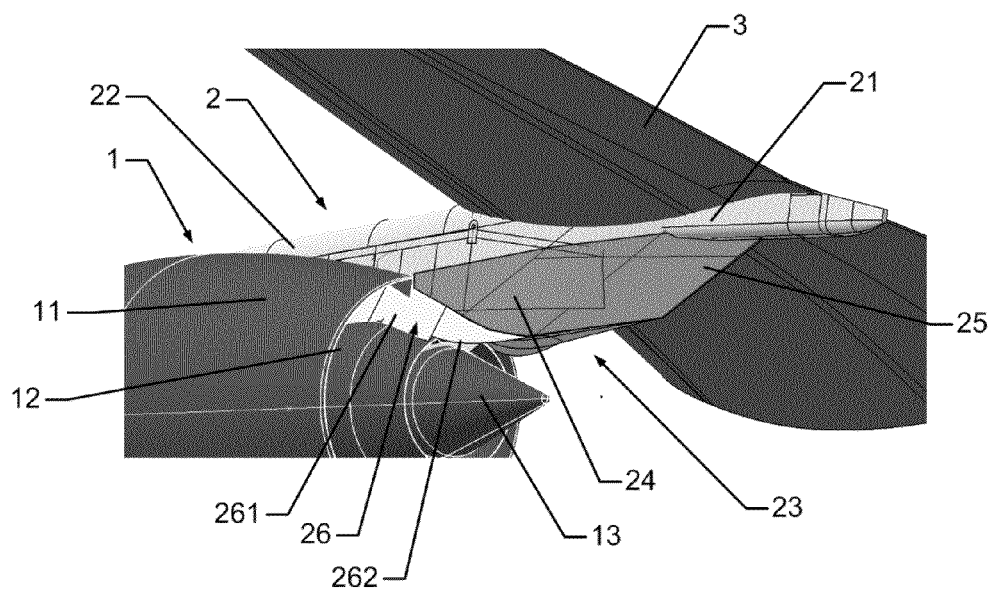
FIG. 3B is a representation of a second embodiment of a pylon according to the invention supporting a turboshaft engine on an aircraft wing, the external absorption part of the pylon being covered with a porous material.

According to a second embodiment of the invention, in reference to FIG. 3B, the porous material covers all the outer surface of the external absorption part 24 of the pylon 2, i.e. all the part of the pylon 2 extending in the exhaust stream downstream from the exhaust plane P. The reflection of the low frequency acoustic waves and the amplitude of the reflected waves are decreased which allows to improve, in an even more significant way, the attenuation of noise. Besides, such an attenuation does not impair the aerodynamic behavior of the pylon 2.

Figure 3C:
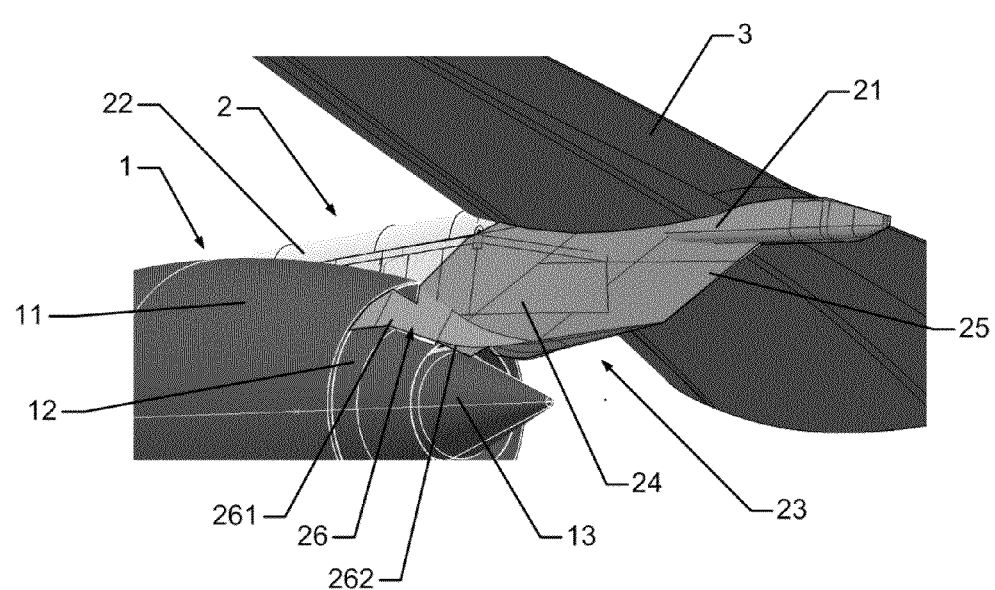
FIG. 3C is a representation of a third embodiment of a pylon according to the invention supporting a turboshaft engine on an aircraft wing, the whole absorption part of the pylon being covered with a porous material.

According to a third embodiment of the invention, in reference to FIG. 3C, the porous material covers all the outer surface of the absorption part 23, i.e. both its external part 24 and internal part 26. In particular, the porous material covers the secondary securing zone 261 and the primary securing zone 262 so as to limit the generation of low frequency acoustic waves. Besides the advantages previously cited for the external part 24, the porous material of the internal part 26 acts as a noise extinguisher by limiting the formation of low frequency acoustic waves $P_{BF}$ between 25 Hz and 200 Hz.

So, in a synergic way with the coating of the external part 24, the coating of the internal part 26 allows to limit the sources of the waves reflected at high frequencies. The noise generated by a turboshaft engine with a pylon 2 is strongly reduced.

During the use of the turboshaft engine with a pylon according to the third embodiment of the invention, primary and secondary streams, after circulation in the turboshaft engine 1, exhaust between the inner cone 13 and the primary nozzle 12 and between the primary nozzle 12 and the exhaust cowl 11, respectively. The secondary 261 and primary 262 securing zones covered at the surface with the porous material advantageously allow to limit the generation of low frequency acoustic waves.

When the primary and secondary streams are convergent, turbulences are generated which move downstream from the turboshaft engine. The porous material of the external absorption part 24 absorbs a portion of the incident low frequency waves and thus limits the generation of high frequency reflected waves. Besides, the waves which are reflected by the external absorption part 24 sparsely contribute to the noise since their amplitude was attenuated by the internal absorption part 26.

Thanks to the invention, the generation of acoustic waves, their reflection and their amplitude are restrained, which allows to limit the generation of noise produced by a turboshaft engine (single stream or separate streams) and its pylon.

Advantageously, the invention also concerns an assembly of an aircraft wing and a pylon according to the invention, wherein the wing has on its outer surface, intended to be in contact with the exhaust stream downstream from the turboshaft engine, a porous material similar to that used for the pylon to limit the formation of noises. So, the emitted acoustic waves are attenuated both by the pylon and the wing of the aircraft.

The zones likely to generate noise by interaction with the exhaust stream of the turboshaft engine are thus protected in a localized way without affecting the aerodynamic performances of the engine.

The invention claimed is:

1. A pylon supporting a turboshaft engine on an aircraft, the pylon longitudinally extending from upstream to downstream and comprising:
    an upper securing part for securing to the aircraft and a lower securing part for securing to the turboshaft engine, the upper securing part to the aircraft being downstream from the lower securing part to the turboshaft engine; and
    an absorption part configured to extend in an exhaust stream of the turboshaft engine, located downstream from the lower securing part to the turboshaft engine and located bottomly with respect to the upper securing part to the aircraft,
    wherein the absorption part comprises an internal part upstream of an exhaust plane of the turboshaft engine and extending inside the turboshaft engine, and an external part downstream of the exhaust plane of the turboshaft engine, the internal part including a main securing zone and a secondary securing zone, and
    wherein an outer surface of a downstream end of the external part of the absorption part is covered with a porous material arranged to reduce intensity of acoustic waves at an outlet of the turboshaft engine.

2. A pylon according to claim 1, wherein the porous material of the pylon is a metal foam.

3. A pylon according to claim 1, wherein a whole of the outer surface of the absorption part is covered with the porous material.

4. A pylon according to claim 1, wherein the porous material is configured to attenuate by at least 6 dB acoustic waves emitted in a range of high frequencies between 200 Hz and 1 kHz to limit generation of kinetic energy at the outlet of the turboshaft engine.

5. A pylon according to claim 4, wherein the porous material is arranged to attenuate by at least 10 dB acoustic waves emitted in a range of high frequencies between 400 Hz and 600 Hz.

6. An assembly comprising:
a turboshaft engine; and
a pylon according to claim 1.

7. An assembly according to claim 6, wherein a whole of the outer surface of the external part is covered with the porous material.

8. An assembly according to claim 6, wherein a whole of the outer surface of the internal part is covered with the porous material.

9. An assembly according to claim 6, wherein the porous material of the pylon is a metal foam.

10. An assembly according to claim 6, wherein the porous material is configured to attenuate by at least 6 dB acoustic waves emitted in a range of high frequencies between 200 Hz and 1 kHz to limit generation of kinetic energy at the outlet of the turboshaft engine.

11. An assembly according to claim 10, wherein the porous material is arranged to attenuate by at least 10 dB acoustic waves emitted in a range of high frequencies between 400 Hz and 600 Hz.

\* \* \* \* \*